US010125300B2

(12) United States Patent
Braley et al.

(10) Patent No.: US 10,125,300 B2
(45) Date of Patent: Nov. 13, 2018

(54) WELLBORE SERVICING COMPOSITIONS AND METHODS OF MAKING AND USING SAME

(71) Applicant: Halliburton Energy Services, Inc., Houston, TX (US)

(72) Inventors: Nicholas Charles Braley, Spring, TX (US); Anthony M. Badalamenti, Katy, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 112 days.

(21) Appl. No.: 14/987,327

(22) Filed: Jan. 4, 2016

(65) Prior Publication Data
US 2016/0115364 A1 Apr. 28, 2016

Related U.S. Application Data

(63) Continuation of application No. 13/709,776, filed on Dec. 10, 2012.

(51) Int. Cl.
C09K 8/035 (2006.01)
C09K 8/42 (2006.01)
C09K 8/516 (2006.01)
C09K 8/44 (2006.01)
E21B 33/138 (2006.01)

(52) U.S. Cl.
CPC .............. C09K 8/035 (2013.01); C09K 8/42 (2013.01); C09K 8/44 (2013.01); C09K 8/516 (2013.01); E21B 33/138 (2013.01)

(58) Field of Classification Search
CPC . C09K 8/04; C09K 8/08; C09K 8/203; C09K 8/467; C09K 8/52; C09K 8/524; C09K 8/528; C09K 8/532; C09K 8/565; C09K 8/572; C09K 8/602; C09K 8/62; C09K 8/665; C09K 8/685; C09K 8/725; C09K 8/80; C09K 8/035; C09K 8/32; C09K 8/36; C09K 2208/08; C09K 2208/34; C09K 8/032; C09K 8/05; C09K 8/34; C09K 8/42; C09K 8/426; C09K 8/516; C09K 8/64; C09K 8/90; C09K 2208/02; C09K 2208/04
See application file for complete search history.

(56) References Cited

U.S. PATENT DOCUMENTS

| 3,108,979 | A | 10/1963 | Fevre et al. | |
| 3,399,159 | A | 8/1968 | Samour | |
| 3,467,208 | A * | 9/1969 | Kelly, Jr. | E21B 21/003 166/294 |
| 3,793,244 | A | 2/1974 | Megee et al. | |
| 4,560,736 | A | 12/1985 | Pischke et al. | |
| 4,791,161 | A | 12/1988 | Leising | |
| 4,861,822 | A | 8/1989 | Keskey et al. | |
| 5,293,938 | A | 3/1994 | Onan et al. | |
| 5,373,901 | A | 12/1994 | Norman et al. | |
| 5,563,201 | A | 10/1996 | Joanicot et al. | |
| 5,913,364 | A | 6/1999 | Sweatman | |
| 6,167,967 | B1 | 1/2001 | Sweatman | |
| 6,171,386 | B1 | 1/2001 | Sabins | |
| 6,184,287 | B1 | 2/2001 | Westerman | |
| 6,209,646 | B1 | 4/2001 | Reddy et al. | |
| 6,258,757 | B1 | 7/2001 | Sweatman et al. | |
| 6,444,316 | B1 * | 9/2002 | Reddy | B01J 13/22 427/212 |
| 6,488,764 | B2 | 12/2002 | Westerman | |
| 6,508,306 | B1 * | 1/2003 | Reddy | C09K 8/5083 166/293 |
| 6,527,051 | B1 | 3/2003 | Reddy et al. | |
| 6,554,071 | B1 | 4/2003 | Reddy et al. | |
| 6,877,563 | B2 | 4/2005 | Todd et al. | |
| 7,021,383 | B2 | 4/2006 | Todd et al. | |
| 7,143,828 | B2 | 12/2006 | Reddy et al. | |
| 7,431,088 | B2 | 10/2008 | Moorehead et al. | |
| 7,455,112 | B2 | 11/2008 | Moorehead et al. | |
| 7,488,705 | B2 | 2/2009 | Reddy et al. | |
| 7,923,415 | B2 | 4/2011 | Panga et al. | |
| 8,100,180 | B2 | 1/2012 | Reddy et al. | |
| RE43,168 | E | 2/2012 | Westerman | |
| 8,623,936 | B2 | 1/2014 | Roddy et al. | |
| 2002/0160919 | A1 * | 10/2002 | Stowe, II | C09K 8/24 507/100 |
| 2006/0122071 | A1 | 6/2006 | Reddy et al. | |
| 2007/0173416 | A1 | 7/2007 | Moorehead et al. | |
| 2008/0160203 | A1 * | 7/2008 | O' Leary | C08J 9/12 427/427.4 |
| 2009/0137431 | A1 * | 5/2009 | Reddy | C09K 8/5045 507/210 |
| 2010/0035772 | A1 * | 2/2010 | Reddy | C09K 8/24 507/118 |

(Continued)

OTHER PUBLICATIONS

Examination Report for European Patent Application No. 13792215.9 prepared by the European Patent Office dated Jun. 14, 2016. (6 pages). http://www.thefreedictionary.com/p/brine (downloaded on Aug. 19, 2014).
http://www.thefreedictionary.com/p/calcium%20chloride (downloaded on May 2, 2014).
International Search Report and Written Opinion received in Patent Cooperation Treaty Application No. PCT/US2013/068648, dated Jan. 21, 2014, 9 pages.
Written Opinion of the International Preliminary Examining Authority received in Patent Cooperation Treaty Application No. PCT/US2013/068648, dated Dec. 12, 2014, 6 pages.
Halliburton brochure entitled "FlexPlug® OBM, Lost-Circulation Material," Cementing, Aug. 2007, 2 pages.

(Continued)

Primary Examiner — Kumar R Bhushan
(74) Attorney, Agent, or Firm — Haynes and Boone, LLP

(57) ABSTRACT

A method of servicing a wellbore in a subterranean formation having one or more lost circulation zones comprising placing a wellbore servicing fluid comprising a sealing composition into the wellbore, wherein the sealing composition comprises a latex and an accelerator and wherein the latex, the accelerator or both are encapsulated with an encapsulation material. A wellbore servicing fluid comprising a latex and an accelerator wherein the latex, the accelerator, or both are encapsulated.

15 Claims, No Drawings

(56) References Cited

U.S. PATENT DOCUMENTS

| | | | |
|---|---|---|---|
| 2010/0273685 A1 | 10/2010 | Saini et al. | |
| 2010/0314111 A1* | 12/2010 | Karcher | C04B 28/02 166/293 |
| 2011/0028593 A1* | 2/2011 | Roddy | C04B 24/26 523/130 |
| 2011/0053813 A1* | 3/2011 | Panga | C09K 8/08 507/224 |
| 2012/0205105 A1* | 8/2012 | Le Roy-Delage | C04B 28/02 166/292 |

OTHER PUBLICATIONS

Halliburton brochure entitled "FlexPlug® Service, for curing lost circulation, improving wellbore pressure containment and drilling ahead," Fluid Systems, Jul. 2005, 4 pages.

Halliburton brochure entitled "FlexPlug® W, Lost Circulation Material," Cementing, Aug. 2007, 2 pages.

Halliburton brochure entitled "Fuse-It™, Lost Circulation Treatment," Baroid Fluid Services, May 2006, 2 pages.

Halliburton brochure entitled "Latex 2000, Cement Additive," Cementing, Aug. 2007, 2 pages.

Halliburton brochure entitled "Latex 3000™, Cement Additive," Cementing, Jun. 2010, 1 page.

\* cited by examiner

WELLBORE SERVICING COMPOSITIONS AND METHODS OF MAKING AND USING SAME

CROSS-REFERENCE TO RELATED APPLICATIONS

The present application is a continuation of U.S. patent application Ser. No. 13/709,776 filed on Dec. 10, 2012, the entire contents of which are incorporated herein by reference.

STATEMENT REGARDING FEDERALLY SPONSORED RESEARCH OR DEVELOPMENT

Not applicable.

BACKGROUND

Field

This disclosure relates to methods of servicing a wellbore. More specifically, it relates to methods of treating lost circulation zones with latex-based materials.

Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well.

Fluids used in servicing a wellbore may be lost to the subterranean formation while circulating the fluids in the wellbore or otherwise placing fluids in the wellbore. In particular, the fluids may enter and be "lost" to the subterranean formation via lost circulation zones (LCZs) for example, depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being terminated and/or too low to allow for further drilling of the wellbore. Such conditions may be referred to as partial or complete loss of circulation or lost circulation. Also, a secondary cement/sealant composition may be lost to the formation as it is being placed in the wellbore, thereby rendering the secondary operation ineffective in maintaining isolation of the formation.

Conventional solutions to preventing loss of wellbore fluids to an LCZ involve forming a viscous mass in the LCZ. Frequently, the viscous masses are easily deformable and may breakdown under fluid pressure, thereby allowing reestablishment of a fluid flow channel within the LCZ. Accordingly, an ongoing need exists for more effective compositions and methods of blocking the flow of fluid through LCZs in subterranean formations.

SUMMARY

Disclosed herein is a method of servicing a wellbore in a subterranean formation having one or more lost circulation zones comprising placing a wellbore servicing fluid comprising a sealing composition into the wellbore wherein the sealing composition comprises a latex and an accelerator and wherein the latex, the accelerator, or both are encapsulated with an encapsulation material.

Also disclosed herein is a wellbore servicing fluid comprising a latex and an accelerator wherein the latex, the accelerator, or both are encapsulated.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids comprising a two component system for the treatment of lost circulation and methods of using same. In an embodiment, the first component is a latex and the second component is an accelerator. A latex herein refers to any number of polymeric materials commonly known as a "polymer emulsion," that includes a water emulsion of a rubber or plastic obtained by polymerization. The latex and the accelerator component may be contacted to form a latex sealant composition (LSC). The components of the LSC may be included in a wellbore servicing fluid (WSF) and when placed in a subterranean formation may react and form and LSC that modifies the permeability of at least a portion of a formation in a manner that facilitates wellbore servicing operations. In some embodiments, the WSF forms a filtercake on a surface of the formation, wherein the filtercake comprises the LSC. In other embodiments, the WSF enters the LCZ and deposits the two component system therein (e.g., wherein the components react and form an LSC plug or impermeable solid mass therein) such that the LSC is effective to reduce or eliminate the loss of material to the LCZ.

In an embodiment, the latex comprises a naturally-occurring material. Alternatively, the latex comprises a synthetic material. Alternatively, the latex comprises a mixture of a naturally-occurring and a synthetic material.

Latexes suitable for use in the present disclosure may be in the form of an emulsion comprising an aqueous medium with extremely fine liquid or solid polymer particles dispersed therein. In an embodiment, a latex suitable for use in the present disclosure is in the form of an emulsion comprising about 50% of an aqueous component, alternatively from about 30% to about 70% or alternatively from about 40% to about 60% based on the total weight of the emulsion.

In an embodiment, the latex comprises any material able to set into a solid mass and decrease the permeability of the area (e.g., a LCZ) in which the material is disposed when contacted with an accelerator of the type disclosed herein, thereby forming a LSC. In an embodiment, the latex comprises a polymer, an alkali-swellable latex, a cationic latex, or combinations thereof.

In an embodiment, the latex comprises a polymer. Herein, the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Examples of latex polymers suitable for use in the present disclosure include, but are not limited to homopolymers, copolymers, random, block, star- and hyper-branched polymers, derivatives thereof, and combinations thereof. The term "copolymer" as used herein is not limited to the combination of two polymers, but includes any combination of polymers, e.g., graft polymers, terpolymers and the like. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

In an embodiment, the latex polymer comprises isoprene, styrene, acrylonitrile, butadiene, or combinations thereof. In an embodiment, the latex polymer comprises a styrene copolymer dispersed in water to form an aqueous emulsion. In an embodiment, the weight ratio of the styrene to a co-monomer (e.g., butadiene) is about 1:99, alternatively about 10:90, alternatively about 20:80, alternatively about 30:70, alternatively about 40:60, alternatively about 50:50, alternatively about 60:40, alternatively about 70:30, alternatively about 80:20, alternatively about 90:10, alternatively about 99:1. Alternatively, in an embodiment, the latex comprises 100% styrene.

In an embodiment, the latex comprises an alkali swellable latex. "Alkali swellable latex" is defined herein as a latex emulsion that, when exposed to pH-increasing materials, may swell and exhibit an increase in viscosity. Alkali swellable latexes typically contain, in addition to typical latex-forming monomers, other monomers having acidic groups capable of reacting with pH increasing materials, thereby forming anionic pendant groups on the polymer back bone. Examples of typical latex-forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

Monomers containing acid groups capable of reacting with pH-increasing materials include ethylenically unsaturated monomers having at least one carboxylic acid functional group. Without limitation, examples of such carboxylic acid containing groups include acrylic acid, alkyl acrylic acids, such as methacrylic acid and ethacrylic acid, alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid, itaconic acid, maleic acid, citraconic acid, mesaconic acid, glutaconic acid, aconitic acid, fumaric acid, tricarboxy ethylene, or combinations thereof. In some embodiments, the carboxylic acid containing groups include itaconic acid, acrylic acid, or combinations thereof.

Preparation of alkali swellable latexes is discussed in U.S. Pat. Nos. 3,793,244; 4,861,822; and 5,563,201, each of which are incorporated herein by reference in their entirety. Without limitation, examples of suitable commercially available alkali swellable latexes include TYCHEM 68710, available from Dow Reichhold Specialty Latex LLC; ACRYSOL TT 615, available from Rohm and Haas; SN THICKENERS 920, 922, 924, 634 and 636, available from San Napco Limited, Sanyo Chemical Industry, Japan; ALCOGUM SL-120, available from Alco Chemical, a National Starch Company; HEUR-ASE P206, available from Dow Chemical Company; ADCOTE 37-220, available from Rohm and Haas Company; and JETSIZE AE-75, available from Eka Chemicals.

An alkali swellable latex may contain crosslinking agents that are suitable for facilitating the formation of a resilient rubbery mass, which may be used during the polymerization stage of the monomers or added to the latex prior to use (for example to the LCSL). In embodiments wherein the alkali swellable latex contains vulcanizable groups, such as the diene type of monomers, crosslinking agents including vulcanizing agents such as sulfur, 2,2'-dithiobisbenzothiazole, organic peroxides, azo compounds, alkylthiuram disulfides, selenium phenolic derivatives and the like; vulcanization accelerators such as fatty acids (e.g., stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof; may be added just prior to use, for instance to a sealant composition. Such compositions are discussed in U.S. Pat. No. 5,293,938, which is incorporated by reference herein in its entirety. If the crosslinking agent is used during production of the latex, it may be a multifunctional monomer with more than one polymerizable group, for example divinylbenzene, trimethylolpropane triacrylate, tetraethyleneglycol diacrylate, methylene bisacrylamide, and the like.

In an embodiment, the latex comprises a cationic latex. In an embodiment, the cationic latexes comprise latex-forming monomers and positively charged monomers. Nonlimiting examples of latex-forming monomers suitable for use in the present disclosure include vinyl aromatic monomers (e.g., styrene based monomers), ethylene, butadiene, vinylnitrile (e.g., acrylonitrile), olefinically unsaturated esters of $C_1$-$C_8$ alcohols, non-ionic monomers that exhibit steric effects and that contain ethoxylate or hydrocarbon tails, or combinations thereof. In an embodiment, the positively charged monomers comprise monomers that already have a positive charge that cannot be neutralized at pH values greater than about 10, alternatively positively charged monomers which can be neutralized at pH values greater than about 10. Nonlimiting examples of positively charged monomers suitable for use in the present disclosure include monomers containing quaternary ammonium groups, trimethylaminopropylmethacrylamide bromide, monomers containing other-onium species, such as trialkylsulfonium or tetraalkylphosphonium structures, protonated tertiary amines, or combinations thereof. In an embodiment, the positively charged monomer comprises dimethylaminomethacrylamide, which when polymerized in an acidic medium become cationic by protonation of amine nitrogen.

A cationic latex may be prepared using any suitable methodology. For example, a cationic latex may be prepared by conventional emulsion polymerization using an azo initiator such as 2,2'-azobis(isobutylamidine hydrochloride). Alternatively, the cationic latex may be produced through the copolymerization of a latex with cationic or amine containing comonomers. Methods of preparing cationic latexes are described in more detail in U.S. Pat. Nos. 4,791,161; 4,560,736; 3,108,979; and 3,399,159, each of which is incorporated by reference herein in its entirety.

In an embodiment, the latex may comprise at least one polar monomer and at least one elasticity-enhancing monomer. According to certain embodiments, the latex further comprises at least one stiffness-enhancing monomer.

According to the embodiments illustrated herein, the polar monomer may comprise vinylamine, vinyl acetate, acrylonitrile, or acid, ester, amide, or salt forms of acrylates, such as acrylic acid; and the elasticity-enhancing monomer may be selected from ethylene, propylene, butadiene, 1,3-hexadiene or isoprene. In the embodiments that include a stiffness-enhancing monomer, the stiffness-enhancing monomer may comprise styrene, t-butylstyrene, α-methylstyrene, sulfonated styrene or combinations thereof.

Additional disclosure on a latex comprising at least one polar monomer and at least one elasticity-enhancing monomer may be found in U.S. Published Application No. 2005/0167106A1, which is incorporated herein by reference in its entirety.

In an embodiment, the latex comprises LATEX 2000 cement additive or LATEX 3000 cement additive which are commercially available from Halliburton Energy Services, Inc. LATEX 2000 cement additive is a liquid additive designed to impart excellent fluid-loss control, high-temperature suspension properties, and acid resistance to cement slurries. LATEX 3000 cement additive is a liquid additive designed to lower equivalent circulating density and impart excellent fluid-loss control, high-temperature suspension properties, and acid resistance to cement slurries.

Although the disclosure refers to a latex as a polymer emulsion, in some embodiments, a latex suitable for use in the present disclosure is a "solid latex." Herein, a "solid latex" refers to latex which is a free flowing particulate material that is substantially dry or free of fluid. Solid latexes may be prepared by removing water from any emulsion polymerized polymer systems such as described herein. Water may be removed from emulsion polymerized polymer systems using any suitable methodology such as spray drying. The solid latex may be rehydrated before and/or during formation of the WSF, for example by mixing the dry latex with an aqueous fluid in the formation of the WSF (e.g., a lost circulation fluid).

In an embodiment, the latex component reacts with an accelerator component to form an LSC. The accelerator may be a compound which when contacted with a latex of the type disclosed herein facilitates the formation of a sealant composition (i.e., LCSL) that is able to obstruct a flowpath into which it is disposed. In an embodiment, the accelerator comprises pH-modifying material precursors, inorganic bases, organic bases, salts, or combinations thereof.

In an embodiment, the accelerator comprises a pH-modifying material precursor. Herein, a pH-modifying material precursor (e.g., base precursor, acid precursor) is defined as a material or combination of materials that provides for delayed release of one or more acidic or basic species. Such pH-modifying material precursors may also be referred to as time-delayed and/or time-released acids or bases. In some embodiments, the pH-modifying material precursors comprise a material or combination of materials that may react to generate and/or liberate an acid or a base after a period of time has elapsed. The liberation of the acidic or basic species from the pH-modifying material precursor may be accomplished through any means known to one of ordinary skill in the art with the benefits of this disclosure and compatible with the user-desired applications.

In some embodiments, pH-modifying material precursors may be formed by modifying acids or bases via the addition of an operable functionality or substituent, physical encapsulation or packaging, or combinations thereof. The operable functionality or substituent may be acted upon in any fashion (e.g., chemically, physically, thermally, etc.) and under any conditions compatible with the components of the process in order to release the acid or the base at a some user and/or process desired time and/or under desired conditions such as in situ wellbore conditions. In an embodiment, the pH-modifying material precursor may comprise at least one modified acid or base (e.g., having an operable functionality, encapsulation, packaging, etc.) such that when acted upon and/or in response to pre-defined conditions (e.g., in situ wellbore conditions such as temperature, pressure, chemical environment), an acid or base is released. In an embodiment, the pH-modifying material precursor may comprise an acidic or basic species that is released after exposure to an elevated temperature such as an elevated wellbore temperature (e.g., greater than about 150° F.). In an embodiment, the pH-modifying material precursor comprises a material which reacts with one or more components of the wellbore servicing fluid (e.g., reacts with an aqueous fluid present in the wellbore servicing fluid) to liberate at least one acidic or basic species.

A pH-modifying material precursor as used herein generally refers to a component, which itself does not act as an acid or base by significantly modifying the pH of a solution into which it is introduced, but which, upon degradation, will yield one or more components capable of acting as an acid or a base by modifying the pH of that solution. For example, in an embodiment a pH-modifying material precursor may yield one or more components capable of modifying the pH of a solution by about 0.1 pH units, alternatively about 0.2 pH units, alternatively about 0.5 pH units, alternatively about 1.0 pH units, alternatively about 1.5 pH units, alternatively about 2.0 pH units, alternatively about 2.5 pH units, alternatively about 3.0 pH units, alternatively about 4.0 pH units, alternatively about 5.0 pH units, alternatively about 6.0 pH units, or alternatively about 7.0 or more pH units and such modifications may be an increase or decrease in pH.

In an embodiment, the pH-modifying material precursor may be characterized as exhibiting a suitable delay time. As used herein, the term "delay time" refers to the period of time from when a pH-modifying material precursor, or a combination of pH-modifying material precursors, is introduced into a WSF (e.g., from the time the WSF is prepare/mixed) and/or introduced to an operational environment until the pH-modifying material precursor or combination of precursors begins to alter (e.g., begins to degrade) the latex-based emulsion, as will be disclosed herein. In an embodiment, the pH-modifying material precursor may exhibit an average delay time of at least about 1 hour, alternatively at least about 2 hours, alternatively at least about 4 hours, alternatively at least about 8 hours, alternatively at least about 12 hours, alternatively at least about 24 hours.

In an embodiment, the pH-modifying material precursor may be characterized as operable, as disclosed herein, within a suitable temperature range. As will be appreciated by one of skill in the art viewing this disclosure, differing pH-modifying material precursors may exhibit varying temperature ranges of operability. As such, in an embodiment, a pH-modifying material precursor, or combination of pH-modifying material precursors, may be selected for inclusion in the LSC such that the pH-modifying material precursor(s) exhibit a desired operable temperature range (e.g., an ambient downhole temperature for a given wellbore). In addition, as will also be appreciated by one of skill in the art viewing this disclose, the degradation of the pH-modifying material precursor may be influenced by the temperature of the operational environment. For example, generally the rate of degradation of a given pH-modifying material precursor will be higher at higher temperatures. As such, the rate of degradation of a given pH-modifying material precursor may be generally higher when exposed to the environment within the wellbore. In an embodiment, the pH-modifying material precursor suitable for use in the present disclosure may exhibit an operable temperature range of from about 100° F. to about 375° F., alternatively from about 125° F. to about 350° F., or alternatively from about 150° F. to about 300° F.

In an embodiment, the pH-modifying material precursor is an acid precursor. In an embodiment, the acid precursor comprises a reactive ester. Hereinafter, the disclosure will focus on the use of a reactive ester as the acid precursor with the understanding that other acid precursors may be used in various embodiments. The reactive ester may be converted to an acidic species by hydrolysis of the ester linkage, for example by contact with water present in the wellbore servicing fluid and/or water present in situ in the wellbore. In an embodiment, the acid precursor may comprise a lactone or lactide, a formate ester, a lactate ester, an acetate ester, a polyester, or combinations thereof.

In an embodiment, the acid precursor comprises esters and polyesters of acids of the type described herein; esters or polyesters of polyols (e.g., glycerol, glycols) with acids of the type described herein; aliphatic polyesters; glucono-delta-lactone; glucoheptonic lactone; poly(ε-caprolactones); poly(hydroxybutyrates); poly(anhydrides); aliphatic polycarbonates; poly(amino acids); polyphosphazenes; poly(ortho esters); orthoesters (which may also be known as "poly ortho esters" or "ortho esters; or combinations thereof. Nonlimiting examples of acid precursors suitable for use in the present disclosure include monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof. Other examples of acid precursors suitable for use as accelerators in this disclosure are described in more detail in U.S. Pat. Nos. 6,877,563; 7,021,383, 7,431,088 and 7,455,112 and U.S. Patent Application Publication No. 20070173416 A1, each of which is incorporated by reference herein in its entirety.

In an embodiment, the accelerator comprises an acid. Nonlimiting examples of acids suitable for use in the present disclosure include formic acid; acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; para-toluene sulfonic acid; sulphinic acid; phosphoric acid; phosphorous acid; phosphonic acid; phosphinic acid; sulphamic acid; citric acid; or combinations thereof.

In an embodiment, the pH-modifying material precursor is a base precursor. A base precursor (i.e., base-producing material) includes any compound capable of generating hydroxyl ions ($HO^-$) in water to react with or neutralize an acid to from a salt. It is to be understood that the base-producing material can include chemicals that produce a base when reacted together. Without limitation, examples include reaction of an oxide with water. In one embodiment, the base-producing material has at least partial solubility in water, for example a solubility of about 1% or greater in water. Nonlimiting examples of base-producing materials suitable for use in this disclosure include ammonium, alkali and alkali earth metal carbonates and bicarbonates, alkali and alkali earth metal oxides, alkali and alkali earth metal hydroxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof. Other examples of bases suitable for use as accelerators in this disclosure are described in more detail in U.S. Patent Publication No. 20100273685 A1, which is incorporated by reference herein in its entirety.

Nonlimiting examples of alkali and alkali earth metal carbonates and bicarbonates suitable for use in this disclosure include $Na_2CO_3$, $K_2CO_3$, $CaCO_3$, $MgCO_3$, $NaHCO_3$, $KHCO_3$. It is to be understood that when carbonate and bicarbonate salts are used as base-producing material, a byproduct may be carbon dioxide, which may modify the mechanical properties of the LSC.

Nonlimiting examples of alkali and alkali earth metal hydroxides suitable for use in this disclosure include NaOH, $NH_4OH$, KOH, LiOH, and $Mg(OH)_2$.

Nonlimiting examples of alkali and alkali earth metal oxides suitable for use in this disclosure include BaO, SrO, $Li_2O$, CaO, $Na_2O$, $K_2O$, MgO, and the like. Nonlimiting examples of alkali and alkali earth metal phosphates and hydrogen phosphates suitable for use in this disclosure include $Na_3PO_4$, $Ca_3(PO_4)_2$, $CaHPO_4$, $KH_2PO_4$, and the like. Nonlimiting examples of alkali and alkali earth metal sulphides suitable for use in this disclosure include $Na_2S$, CaS, SrS, and the like.

Nonlimiting examples of silicate salts suitable for use in this disclosure include sodium silicate, potassium silicate, sodium metasilicate, and the like. Nonlimiting examples of aluminate salts suitable for use in this disclosure include sodium aluminate, calcium aluminate, and the like Nonlimiting examples of organic amines suitable for use in this disclosure include polymeric amines, monomeric amines containing one or more amine groups, oligomeric amines, oligomers of aziridine, triethylene tetramine, tetraethylene pentamine, secondary amines, tertiary amines. The organic amines may be completely or partially soluble in water. The organic amines may also be dissolved in an organic fluid such as those used as base oils in non-aqueous drilling fluids such as hydrocarbons and esters.

Nonlimiting examples of water soluble or water dispersible amines suitable for use in this disclosure include triethylamine, aniline, dimethylaniline, ethylenediamine, diethylene triamine, cyclohexylamine, diethyltoluene diamine, 2,4,6-tri-dimethylaminomethylphenol, isophoroneamine, and the like.

Nonlimiting examples of polymeric amines suitable for use in this disclosure include chitosan, polylysine, poly (dimethylaminoethylmethacrylate), poly(ethyleneimine), poly(vinylamine-co-vinylalcohol), poly(vinylamine), and the like.

Nonlimiting examples of amino alcohols (i.e., alkanolamines) suitable for use in this disclosure include ethanolamine, triethanolamine, tripropanolamine, and the like.

In an embodiment, the base-producing material comprises a resin such as a thermosetting resin. Nonlimiting examples of thermosetting resins suitable for use in this disclosure include amino resins such as melamine-formaldehyde resins and urea-formaldehyde resins, phenolic resins such as phenol formaldehyde resins, furfural resins, or combinations thereof.

In an embodiment, the accelerator comprises a salt. Nonlimiting examples of salts suitable for use in this disclosure include salts of monovalent (e.g., $Na^+$, $K^+$), divalent (e.g., $Ca^{2+}$, $Mg^{2+}$), and trivalent cations, such as salts described herein as pH-modifying materials. In an embodiment, the accelerator comprises $CaCl_2$, $CaBr_2$, $MgCl_2$, $MgBr_2$, $ZnCl_2$, $ZnBr_2$, or combinations thereof.

Additional examples of salts suitable for use in the present disclosure include without limitation an ammonium salt, ammonium sulfate, ammonium chloride, ammonium acetate, and the like, or combinations thereof.

In an embodiment the accelerator may be a brine comprising one or more of the salts disclosed herein. In such embodiments, the brine may have a density of from about 9 lb/gal to about 20 lb/gal, alternatively from about 9 lb/gal to about 15 lb/gal, or alternatively from about 9 lb/gal to about 12 lb/gal.

In an embodiment, the ratio of latex to accelerator present in the LSC is about 10 to about 1, alternatively from about 1 to about 1, or alternatively from about 1 to about 10.

In some embodiments, the reaction between the latex and the accelerator is controlled such that formation of the LSC is delayed until a desired servicing profile (e.g., pumping/placement of the components into the wellbore, for example a LCZ) is achieved. For example, the two components may be pump down separate flow paths (e.g., an internal flowpath defined by a wellbore tubular and an annular space external thereto) and contacts in situ proximate the LCZ. Additionally or alternatively, the two components may be pumped together and formation of the LSC delayed in view of the characteristics of the latex, the accelerant, or both. For example, where the accelerant comprises a pH-modifying material precursor (e.g., an acid or base precursor), the characteristics governing conversion of such precursor material to an acid or base may provide the desired level of control. Additionally or alternatively, coating, encapsulation, or the like may be used as described herein to control reaction of the latex and the accelerator to form the LSC.

In an embodiment, one or both of the components of the LCSL (i.e., the latex and the accelerator) are encapsulated with at least one encapsulating material. Without being limited by theory one or both of the components of the LCSL may be encapsulated to delay their reaction. It is to be understood that the components of the LCSL can be a liquid for example an aqueous solution or an organic liquid, or a solid. If the component (s) comprises an aqueous solution, it may be encapsulated in a particulate porous solid material. The particulate porous solid material comprises any suitable material that remains dry and free flowing after absorbing the aqueous solution and through which the aqueous solution slowly diffuses. Examples of particulate porous solid materials include but are not limited to diatomaceous earth, zeolites, silica, expanded perlite, alumina, metal salts of alumino-silicates, clays, hydrotalcite, styrene divinylbenzene based materials, cross-linked polyalkylacrylate esters, cross-linked modified starches, natural and synthetic hollow fibers, porous beads such as perlite beads, or combinations thereof. If the component(s) is an organic liquid, it may also be encapsulated in hydrophobically modified porous silica in addition to the aforementioned absorbents.

In alternative embodiments, encapsulation further includes an external coating of a material through which the encapsulated material (e.g., latex, accelerator) diffuses. Without being limited by theory, the external coating can be added to further delay the reaction. Examples of external coatings include but are not limited to EPDM rubber, polyvinyldichloride, nylon, waxes, polyurethanes, cross-linked partially hydrolyzed acrylics, cross-linked polyurethane and combinations thereof. In an embodiment, the latex, accelerator or both are encapsulated by spray coating a variety of materials thereon, including but not limited to an EPDM rubber, polyvinyldichloride, nylon, waxes, polyurethanes, cross-linked partially hydrolyzed acrylics, cross-linked polyurethane wax, a drying oil such as tung oil and linseed oil, or combinations thereof.

In an embodiment, one or both of the components of the LCSL (i.e., the latex and the accelerator) are encapsulated with biopolymers, polysaccharides, hydrocolloids, or gums. In an embodiment, the encapsulating material, upon contact with water, may hydrate the outer surface forming a gel layer that encloses the encapsulated material (e.g., latex, accelerator). Nonlimiting examples of encapsulating materials include without limitation cellulose-based polymers, cellulose ethers, methylcellulose, hydroxypropyl methylcellulose, ethylhydroxyethylcellulose, methylhydroxyethylcellulose, bacterial and plant based gums, xanthan, diutan, gellan, gum tragacanth, pestan, and the like, or combinations thereof.

In an embodiment, the encapsulated material (e.g., latex, accelerator) is either hygroscopic and/or incompatible with the encapsulating material. In such an embodiment, the latex and/or the accelerator may be encapsulated in more than one encapsulation coating. In an embodiment, the encapsulated material (e.g., latex, accelerator) is encapsulated in a first porous coating followed by a second coating.

In an embodiment, the first porous coating comprises a dry hydrophobic material including, but not limited to, styrene-butadiene rubber, waxes, low melting polyolefin waxes, oils, polybutylene, atactic polyolefins, or combinations thereof. The first coating of hydrophobic material may be applied to a hygroscopic particulate solid (e.g., latex, accelerator) by spray coating an aqueous solution of the hydrophobic material onto the particulate solid (e.g., latex, accelerator) while simultaneously fluidizing the solid particles with a hot gas such as air or nitrogen. The hot gas evaporates some or all of the water from the coating solution leaving a porous first coating of dry hydrophobic material on the particulate solid (e.g., latex, accelerator).

In an embodiment, the first porous coating comprises a sparingly soluble material including, but not limited to, carbonate, phosphate or sulfate salts of metals such as magnesium, barium, calcium, zirconium and the like. The sparingly soluble material can be sprayed on the particulate solid (e.g., latex, accelerator) in the presence of a hot fluidizing gas as previously described herein. Alternatively, in an embodiment, a first coating of a sparingly soluble material can be formed by reacting an outer layer of the particulate solid (e.g., latex, accelerator) to be encapsulated with a reactant that forms a sparingly soluble material. For example, when calcium chloride (a hygroscopic chemical) is to be encapsulated, the reactant can be sodium carbonate which reacts with an outer layer of the calcium chloride to form a first coating of sparingly soluble calcium carbonate thereon. The reactant can be sprayed onto the particulate solid (e.g., latex, accelerator) while simultaneously fluidizing the chemical particles with hot gas as previously described herein whereby a dry first coating is formed on the particulate solid (e.g., latex, accelerator).

In an embodiment, the second coating comprises a hydrophilic polymer including, but not limited to hydrolyzed acrylic polymers, which may be cross-linked with an aziridine prepolymer, pentaerythritol-tris-[-(aziridinyl) propionate], a carbodiimide, or 1,3-dicyclohexylcarbodiimide. The partially hydrolyzed acrylic polymers are optionally mixed with a particulate micron sized material such as silica prior to or simultaneously with the coating of the encapsulated material (e.g., latex, accelerator). The presence of silica in the coating composition may aid in introducing imperfections in the dry coating to facilitate the controlled release of the encapsulated material (e.g., latex, accelerator). In an embodiment, the second coating may be placed on the first porous coating utilizing the process previously described herein, i.e., spray coating the particulate solid while simultaneously fluidizing the particulate solid with a hot gas. Encapsulation is described in more detail in U.S. Pat. Nos. 5,373,901; 6,527,051; 6,554,071; and 6,209,646, which are incorporated by reference herein in their entirety.

In alternative embodiments, encapsulation further includes an external coating of a material through which the encapsulated material (e.g., latex, accelerator) diffuses. Without being limited by theory, the external coating can be added to further delay the reaction. Examples of external coatings include but are not limited to EPDM rubber, polyvinyldichloride, nylon, waxes, polyurethanes, cross-linked partially hydrolyzed acrylics, cross-linked polyurethane and combinations thereof. In an embodiment, the latex, accelerator or both are encapsulated by spray coating a variety of materials thereon, including but not limited to an EPDM rubber, polyvinyldichloride, nylon, waxes, polyurethanes, cross-linked partially hydrolyzed acrylics, cross-linked polyurethane wax, a drying oil such as tung oil and linseed oil, or combinations thereof. Encapsulation is described in more detail in U.S. Pat. Nos. 5,373,901; 6,527,051; 6,554,071; and 6,209,646, which are incorporated by reference herein in their entirety.

In an embodiment, the latex and accelerator are combined with one or more additional components (for example, an aqueous or non-aqueous bulk fluid) to form a pumpable wellbore servicing fluid of the type described herein. In an embodiment, the components of the LSC are present in the WSF in an amount of from about 10 volume percent (vol. %) to about 90 vol. %, alternatively from about 25 vol. % to about 75 vol. %, or alternatively from about 40 vol. % to about 60 vol. %, based on the total volume of the WSF. In an embodiment, the WSF has a density in the ranging from about 9 lb/gal to about 18 lb/gal.

In an embodiment, an LSC comprises LATEX 2000 cement additive and $CaCl_2$, for example a $CaCl_2$ brine. LATEX 2000 cement additive is a styrene/butadiene copolymer latex emulsion. The weight ratio of the styrene to butadiene in LATEX 2000 cement additive emulsion is about 25:75, and the amount of the copolymer in the LATEX 2000 cement additive emulsion is about 50% by weight of the aqueous emulsion. In an embodiment, the LATEX 2000 cement additive is encapsulated and is suspended in a $CaCl_2$ brine for downhole delivery.

A LSC of the type disclosed herein may be included in any suitable wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the LSC components are encapsulated prior to placement in a WSF. In an embodiment, the latex component only is encapsulated, alternatively the accelerator component only is encapsulated, or alternatively both the latex component and the accelerator component are encapsulated individually. When both the latex component and the accelerator component are encapsulated, they are encapsulated separately, such that they do not contact each other prior to or during the encapsulation process. For example, a LSC component may be prepared as described herein and subsequently spray-coated with an encapsulating material such that the latex component and the accelerator component are physically separated by the encapsulation material. Upon placement in a lost circulation zone, the encapsulating material may experience a decrease in structural integrity as a result of time and/or external stimuli (e.g., temperature, pH, mechanical action, sheer force) such that it no longer inhibits the contact between the latex component and the accelerator component.

In an embodiment, the latex and the accelerator are manufactured and then placed together in the WSF at the well site. Alternatively, the latex and the accelerator are manufactured off-site and are placed together in the WSF at the well site. In another embodiment, either the latex or the accelerator is preformed and the other one would be made on-the-fly (e.g., in real time or on-location), and the two materials would then be placed together in the WSF at the well site. When manufactured or assembled off site, the latex and/or the accelerator may be transported to the well site.

In an embodiment, an LSC of the type disclosed herein is added to a wellbore servicing fluid. In an embodiment, the wellbore servicing fluid is an aqueous-based fluid. In an embodiment, the wellbore servicing fluid is an oil-based fluid. In an embodiment the wellbore servicing fluid comprises an emulsion or an invert-emulsion.

In an embodiment, the WSF comprises an aqueous-based fluid. In an embodiment, the aqueous-based fluid may generally comprise any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate.

In an embodiment, the WSF comprises an oil-in-water emulsion fluid comprising a non-oleaginous (e.g., aqueous) continuous phase and an oleaginous discontinuous phase. In an embodiment, the wellbore servicing fluid comprises a water-in-oil emulsion fluid, termed an invert emulsion, comprising an oleaginous continuous phase and a non-oleaginous discontinuous phase. Examples of oleaginous fluids suitable for use in drilling fluids include, but are not limited to petroleum oils, natural oils, synthetically-derived oils, or combinations thereof. More particularly, examples of oleaginous fluids suitable for use in drilling fluids include, but are not limited to, diesel oil, kerosene oil, mineral oil, synthetic oil, such as polyolefins (e.g., alpha-olefins and/or internal olefins), polydiorganosiloxanes, esters, diesters of carbonic acid, paraffins, or combinations thereof. Any aqueous solution compatible with the other components of the wellbore servicing fluid may comprise the non-oleaginous phase. In an embodiment, the aqueous solution may generally comprise any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof.

The wellbore servicing fluid may comprise additional additives as deemed appropriate for improving the properties of the fluid. Such additives may vary depending on the intended use of the fluid in the wellbore. Examples of such additives include, but are not limited to, emulsifiers, lime, organic/inorganic viscosifiers, weighting agents, glass fibers, carbon fibers, suspending agents, conditioning agents, dispersants, water softeners, oxidation and corrosion inhibitors, thinners, acid gas scavengers and combinations thereof. These additives may be introduced singularly or in combination using any suitable methodology and in amounts effective to produce the desired improvements in fluid properties.

In an embodiment, the LSC may be introduced to the wellbore to prevent the loss of aqueous or non-aqueous drilling fluids into lost circulation zones such as voids, vugular zones, and natural or induced fractures while drilling. In an embodiment, the LSC may be introduced to prevent the loss or migration of fluid into lost circulation zones or undesirable flowpaths such as voids, vugular zones, and natural or induced fractures in the formation.

In an embodiment, a WSF comprising LSC components of the type disclosed herein may be introduced into a wellbore where it may enter a lost circulation zone. Within the lost circulation zone the LSC components may contact each other, upon deterioration of the encapsulation, or upon releasing (i.e., activating) a time delayed agent such as a pH-modifying material. Once the latex component contacts the accelerator component, the LSC rubber mass may form. The LSC rubber mass has a relatively low permeability to fluids used to service a wellbore such as a drilling fluid, a fracturing fluid, a cement, an acidizing fluid, an injectant, and the like, thus creating a barrier to the flow (and undesirable loss) of such fluids to the surrounding formation.

In an embodiment, the LSC components are placed into a wellbore as a single stream and activated by downhole conditions (i.e., the latex component and the accelerator component are contacted together to form a resilient rubber mass) such as temperature, pH, mechanical action, sheer force, and may form a barrier that substantially seals a lost circulation zones or other undesirable flowpath. In such an embodiment, the LSC components may be placed downhole through the drill bit forming a composition that substantially eliminates the lost circulation. In an embodiment, the bit is located proximate a LCZ to allow precise placement of the LSC components. Methods for introducing compositions into a wellbore to seal subterranean zones are described in more detail in U.S. Pat. Nos. 5,913,364; 6,167,967; and 6,258,757, each of which is incorporated by reference herein in its entirety.

In an embodiment, LSCs of the type disclosed herein may advantageously decrease the permeability of the wellbore so as to mitigate the unwanted loss of fluids to the formation. The LSCs of this disclosure may be advantageously used for sealing LCZs that display a high rate of fluid loss of from about 10 bbl/hr to about 100 bbl/hr, alternatively from about 20 bbl/hr to about 80 bbl/hr, or alternatively from about 25 bbl/hr to about 75 bbl/hr.

The exemplary LSC disclosed herein may directly or indirectly affect one or more components or pieces of equipment associated with the preparation, delivery, recapture, recycling, reuse, and/or disposal of the disclosed LSC. In some embodiments, the LSC once formed is not brought to the surface or circulated outside of the wellbore. For example, the disclosed LSC may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary LSC. The disclosed LSC may also directly or indirectly affect any transport or delivery equipment used to convey the LSC to a well site or downhole such as, for example, any transport vessels, conduits, pipelines, trucks, tubulars, and/or pipes used to fluidically move the LSC from one location to another, any pumps, compressors, or motors (e.g., topside or downhole) used to drive the LSC into motion, any valves or related joints used to regulate the pressure or flow rate of the LSC, and any sensors (i.e., pressure and temperature), gauges, and/or combinations thereof, and the like. In an embodiment the latex component of the LSC is prepared offsite while the LSC is formed in situ in the wellbore. The disclosed LSC may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The following are additional enumerated embodiments of the concepts disclosed herein.

A first embodiment which is a method of servicing a wellbore in a subterranean formation having one or more lost circulation zones comprising placing a wellbore servicing fluid comprising a sealing composition into the wellbore, wherein the sealing composition comprises a latex and an accelerator and wherein the latex, the accelerator or both are encapsulated with an encapsulation material.

A second embodiment which is the method of the first embodiment wherein the latex comprises a naturally-occurring material, a synthetic material, or combinations thereof.

A third embodiment which is the method of any of the first through second embodiments wherein the latex is a solid latex or a latex emulsion.

A fourth embodiment which is the method of any of the first through third embodiments wherein the latex comprises a latex-polymer, an alkali-swellable latex; a polar monomer-based latex; an elasticity enhancing monomer-based latex; a stiffness enhancing monomer-based latex; a cationic latex; or combinations thereof.

A fifth embodiment which is the method of the fourth embodiment wherein the latex polymer comprises isoprene, styrene, acrylonitrile, butadiene, or combinations thereof.

A sixth embodiment which is the method of any of the fourth through fifth embodiments wherein the alkali-swellable latex comprises vinyl aromatic monomers, styrene based monomers, ethylene, butadiene, vinylnitrile, acrylonitrile, olefinically unsaturated esters of $C_1$-$C_8$ alcohols, non-ionic monomers that exhibit steric effects and that contain ethoxylate or hydrocarbon tails, derivatives thereof, or combinations thereof.

A seventh embodiment which is the method of any of the fourth through sixth embodiments wherein the polar monomer-based latex comprises vinylamine, vinyl acetate, acrylonitrile, acrylic acid derivatives, acrylates, or combinations thereof; the elasticity enhancing monomer-based latex comprises ethylene, propylene, butadiene, 1,3-hexadiene, isoprene, or combinations thereof and the stiffness enhancing monomer-based latex comprises styrene, t-butylstyrene, α-methylstyrene, sulfonated styrene, or combinations thereof.

An eighth embodiment which is the method of any of the first through seventh embodiments wherein the accelerator comprises pH-modifying material precursors, acid precursors, acids, base precursors, inorganic bases, organic bases, salts, or combinations thereof.

A ninth embodiment which is the method of the eighth embodiment wherein the acid precursor comprises monoethylene monoformate, monoethylene diformate, ethylene glycol monoformate, ethylene glycol diformate, diethylene glycol monoformate, diethylene glycol diformate, triethylene glycol diformate, glyceryl monoformate, glyceryl diformate, glyceryl triformate; formate esters of pentaerythritol, tri-n-propyl orthoformate, tri-n-butyl orthoformate, methyl lactate, ethyl lactate, propyl lactate, butyl lactate, trilactin, polylactic acid, poly(lactides), methyl acetate, ethyl acetate, propyl acetate, butyl acetate, monoacetin, diacetin, triacetin, glyceryl diacetate, glyceryl triacetate, tripropionin (a triester of propionic acid and glycerol), methyl glycolate, ethyl glycolate, propyl glycolate, butyl glycolate, poly(glycolides), or combinations thereof.

A tenth embodiment which is the method of any of the eighth through ninth embodiments wherein the acid comprises formic acid; acetic acid; lactic acid; glycolic acid; oxalic acid; propionic acid; butyric acid; monochloroacetic acid; dichloroacetic acid; trichloroacetic acid; hydrochloric acid; nitric acid; sulphuric acid; sulphonic acid; para-toluene sulfonic acid; sulphinic acid; phosphoric acid; phosphorous acid; phosphonic acid; phosphinic acid; sulphamic acid; citric acid; or combinations thereof.

An eleventh embodiment which is the method of any of the eight through tenth embodiments wherein the base precursor comprises ammonium, alkali and alkali earth metal carbonates and bicarbonates, alkali and alkali earth metal oxides, alkali and alkali earth metal hydroxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof.

A twelfth embodiment which is the method of any of the eighth through eleventh embodiments wherein the salt comprises salts of monovalent, divalent, trivalent cations, or combinations thereof.

A thirteenth embodiment which is the method of any of the first through twelfth embodiments wherein the accelerator comprises a brine having a density of from about 9 lb/gal to about 20 lb/gal.

A fourteenth embodiment which is the method of any of the eighth through thirteenth embodiments wherein the salt comprises an ammonium salt, ammonium sulfate, ammonium chloride, ammonium acetate, and the like, or combinations thereof.

A fifteenth embodiment which is the method of any of the first through fourteenth embodiments wherein the encapsulation is an external coating comprising EPDM rubber, polyvinyldichloride, nylon, waxes, polyurethanes, cross-linked partially hydrolyzed acrylics, cross-linked polyurethane or combinations thereof.

A sixteenth embodiment which is the method of any of the first through fifteenth embodiments wherein the ratio of latex to accelerator in the sealing composition is about 10:1.

A seventeenth embodiment which is the method of any of the first through sixteenth embodiments wherein the wellbore servicing fluid comprises a water-based drilling mud or an oil-based drilling mud.

An eighteenth embodiment which is a wellbore servicing fluid comprising a latex and an accelerator wherein the latex, the accelerator, or both are encapsulated.

A nineteenth embodiment which is the wellbore servicing fluid of the eighteenth embodiment wherein the latex comprises an alkali-swellable latex and the accelerator comprises a base.

A twentieth embodiment which is the wellbore servicing fluid of any of the eighteenth through nineteenth embodiments wherein the latex comprises a styrene/butadiene co-polymer and the accelerator component comprises calcium chloride.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A wellbore servicing fluid configured to transform from a first state to a second state,
   wherein in the first state the fluid comprises:
      a latex; and
      an accelerator selected from a pH-modifying material precursor, a base, an acid, a salt, or combinations thereof;
      wherein the in the first state, the latex is encapsulated with a first encapsulation material selected from EPDM rubber, polyvinyldichloride, nylon, waxes, polyurethanes, cross-linked partially hydrolyzed acrylics and cross-linked polyurethane; and
   wherein in the second state the fluid comprises:
      a sealing composition, the sealing composition being a product of a reaction between the latex and the accelerator; and
   wherein the fluid transforms from the first state to the second state in response to a decrease in structural integrity of the first encapsulation material allowing contact between the latex and the accelerator.

2. The wellbore servicing fluid of claim 1, wherein in the first state the fluid further comprises an aqueous fluid;
   wherein in the first state the latex is a solid latex and wherein at least one of:
      the solid latex is a dry latex and is rehydrated by the wellbore servicing fluid;
      the solid latex is a dry latex and is rehydrated by the aqueous fluid; and
      the solid latex is a dry latex and is rehydrated by a fluid other than the wellbore servicing fluid or the aqueous fluid.

3. The wellbore servicing fluid of claim 1,
   wherein in the first state the accelerator is encapsulated by the first encapsulation material or a second encapsulation material;
   wherein the first encapsulation material or the second encapsulation material comprise at least two coatings, each coating being selected from a first coating, a second coating, and an external coating; and
   wherein the fluid transforms from the first state to the second state in response to a decrease in structural integrity of the first encapsulation material and the second encapsulation material allowing contact between the latex and the accelerator.

4. The wellbore servicing fluid of claim 1, wherein in the first state, the wellbore servicing fluid further comprises a material selected from a water-based drilling mud, an oil-based drilling mud, saltwater, brine, calcium chloride brine having a density of from about 9 lb/gal to about 20 lb/gal, and calcium bromide brine having a density of from about 9 lb/gal to about 20 lb/gal.

5. The wellbore servicing fluid of claim 1, wherein the latex is selected from a solid latex, a dry latex that is rehydrated by the wellbore servicing fluid, a liquid comprising a dry latex that is rehydrated by a fluid, a latex encapsulated by a solid, and a liquid emulsion.

6. The wellbore servicing fluid of claim 1, wherein the first encapsulation material comprises at least two coatings, each being selected from a first coating, a second coating, and an external coating.

7. The wellbore servicing fluid of claim 3, wherein the structural integrity of the first encapsulation material or the second encapsulation material decreases with continued contact with the wellbore servicing fluid.

8. The wellbore servicing fluid of claim 3, wherein the structural integrity of the first encapsulation material or the second encapsulation material decreases due to temperature or pressure changes in the wellbore.

9. The wellbore servicing fluid of claim 1, wherein the accelerator is a brine and the latex is a liquid emulsion suspended in the brine.

10. The wellbore servicing fluid of claim 1, wherein at least one of:
    the latex is a liquid emulsion encapsulated in a particulate porous solid material; and the accelerator is an aqueous solution encapsulated in a particulate porous solid material.

11. The wellbore servicing fluid of claim 1, wherein the first encapsulation material encapsulates the latex and the accelerator in a single coating.

12. The wellbore servicing fluid of claim 1, wherein the latex is coated with a material that reacts with water to form the first encapsulation material.

13. The wellbore servicing fluid of claim 3, wherein the latex is coated with a material that reacts with water to form the first encapsulation material.

14. The wellbore servicing fluid of claim 3, further comprising:
    spraying an aqueous solution onto a solid while simultaneously fluidizing the solid, the aqueous solution comprising a hydrophobic material;
    wherein the latex or the accelerator is the solid; and
    wherein the first encapsulation material or the second encapsulation material is the hydrophobic material.

15. The wellbore servicing fluid of claim 3, wherein in the first state the first encapsulation material or the second encapsulation material comprises at least two coatings, each coating being selected from a first coating, a second coating, and an external coating; and
    wherein the first coating, the second coating, or the external coating is mixed with a material, the material being operable to create an imperfection in the coating; and
    wherein the coating has a structural integrity and the imperfection accelerates a decrease in the structural integrity of the coating.

* * * * *